Nov. 18, 1941.　　　S. DARVIE ET AL　　　2,263,166

SOLDERING BASE

Filed Feb. 10, 1941

INVENTORS
SAMUEL DARVIE
and SAMUEL PEARLMAN
BY
ATTORNEY

Patented Nov. 18, 1941

2,263,166

UNITED STATES PATENT OFFICE 2,263,166

SOLDERING BASE

Samuel Darvie and Samuel Pearlman,
New York, N. Y.

Application February 10, 1941, Serial No. 378,228

8 Claims. (Cl. 113—112)

This invention relates to a means for soldering, and is particularly although not exclusively adapted for effecting soldered joints in jewelry findings, as well as in other articles where two elements must be connected by soldered joints.

In conventional methods of soldering together two members of a structural combination, the usual procedure is to first dip one of the members into a suitable acid, then bring it into engagement with soldering material, and thereafter apply heat, such as by a torch, for the purpose of sweating the solder on to the member. It is then necessary to again dip the member with the adhering solder into the acid, bring it into engagement with the other member to which the first is to be attached, and then apply heat for the purpose of operatively fusing the solder to complete the joint. This method entails a number of separate steps, and is obviously a tedious and time-consuming task, and requires a considerable amount of skill and caution. It is primarily within the contemplation of our invention to enable soldered joints to be quickly and effectively made, with a minimum of effort, and in fewer steps and in less time than has heretofore been found necessary in the employment of conventional soldering methods.

In the above referred to aspect of our invention, it is another object to reduce the soldering operation to a single acid-dipping and heating operation, thereby not only reducing the time for completing a soldered job, but also reducing the skill required therefor.

In effecting soldered connections by conventional methods, it frequently happens that a rather uneven and unsightly soldered joint results, due to the fact that there is no accurately measured amount of solder required for the particular job, and also because there is no well-defined and limited juncture portion within which the solder is to be applied and beyond which it is not to flow. This produces not only an unsightly joint, as aforesaid, but at times, particularly when an insufficient amount of solder is applied, causes a weak soldered joint. It is another object of our invention to eliminate these shortcomings in soldered joints by providing the members to be soldered with means containing only a predetermined amount of solder positioned within a predetermined and limited juncture portion.

And it is a further object of our invention to provide members that are to be soldered together with readily fabricated solder retainers adapted to form part of the soldered joints.

Other objects, features and advantages will appear from the drawing and the description hereinafter given.

Referring to the drawing.

Figure 1:
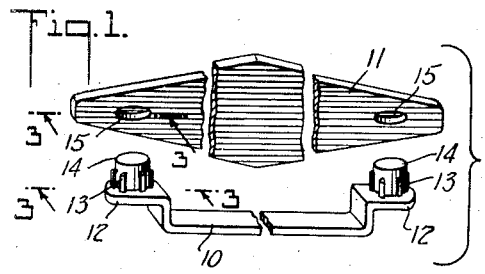
Figure 1 is a detached perspective view of two members adapted to be soldered together by the method and means of this invention.
Figure 2:
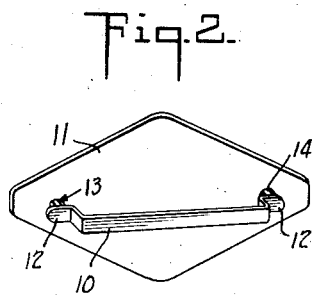
Figure 2 is a perspective view of the members of Figure 1 shown soldered together.

Figures 1 and 2 of the drawing illustrate the application of our invention to a piece of jewelry, it being understood, however, that the particular disclosure is only for illustrative purposes, inasmuch as the means and method of our invention are equally adapted for use with other devices. The two members that are to be attached together are the bar 10 and plate 11, the bar being provided at its juncture portions with the bases 12 each containing the retaining socket or bezel 13 having therein the preformed disk 14 of soldering material. The member 11 contains at its juncture portions the recesses 15 adapted to operatively receive therein a portion of soldering disk 14.

Figure 3:
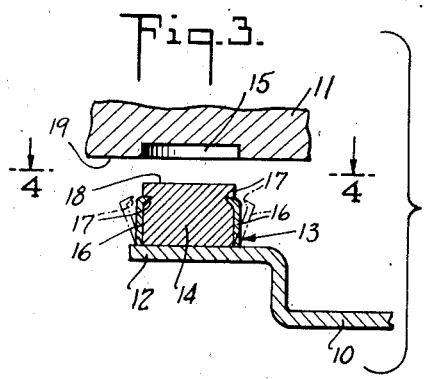
Figure 3 is a fragmentary section of Figure 1 taken substantially along lines 3—3 thereof, showing fragments of the two elements before being operatively joined, the retaining prongs being shown in dot-dash position prior to the insertion of the preformed soldering element.
Figure 4:
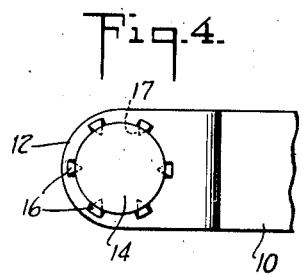
Figure 4 is a plan view of Figure 3 taken substantially along line 4—4.

In the form of our invention illustrated in Figures 3 and 4, the retaining socket is shown to consist of the prong members 16 which, before the insertion of soldering element 14, extend upwardly from the base 12 in the manner illustrated in dot-dash lines. The said prongs 16, of which there may be two or more, preferably extend upwardly and outwardly, the diametrically opposed teeth 17 thereof being separated a sufficient distance to permit the disk 14 to be inserted therebetween and rested upon base 12. The dimensional proportions of disk 14 are predetermined in accordance with the particular requirements, depending upon the weight and proportions of the two members 10 and 11, as well as the size of the receiving recess 15.

After the disk 14 is operatively placed in position, the prongs 16 are, by any suitable pressing means well known in the art, forced inwardly until the teeth 17 penetrate the disk 14, thereby frictionally holding said disk in place. It is apparent that inasmuch as the soldering disk 14 is of relatively soft material, comparatively little effort need be applied to the prongs 16 to enable the teeth thereof to operatively clamp the disk as illustrated. Should there be some plowing through, a slight downward pressure can be applied to the upper surface 18 of the disk, thereby closing in any gaps or holes that may be formed in the disk by the teeth 17. It will be observed that the said disk 14 extends above the retaining member 13, that is, above the teeth of the prongs 16 in the form illustrated, thereby leaving a free and unobstructed portion thereabove. The amount of such protrusion is predetermined in accordance with particular requirements. The depression or recess 15 is similarly proportioned to accommodate said upwardly protruding and unobstructed portion of the disk 14. The lowermost surface 19 is, in the form of our invention shown in Figure 3, adapted to extend substantially to the level of teeth 17. It is to be understood, however, that the depth of recess 15 can be varied according to the particular design requirements, and may be sufficiently deep to enable said surface 19 to rest upon the upper surface of base 12, as will be hereinafter illustrated.

In operatively producing a soldered joint by the means above described, the upper portion of disk 14 is dipped in a suitable acid, the amount of immersion being preferably equal to the distance the disk protrudes above the retaining cup 13. Thereafter the juncture portions of two elements 10 and 11 are brought together, with the said acid-covered protruding portion of disk 14 disposed in the region of recess 15. Heat is applied in the usual manner, and the two elements operatively held together with the said protruding portion completely encased within the said recessed portion 15. In this manner the joint is quickly and readily effected, without any overflow over surface 19, inasmuch as the proportions of the disk and recessed portion 15 have been predetermined to prevent just such an occurrence. It is also obvious that only a single acid-dipping and a single heating operation are required, thereby rendering this method more rapid, more precise and cleaner than is possible with the above-referred to conventional methods.

Figure 5:
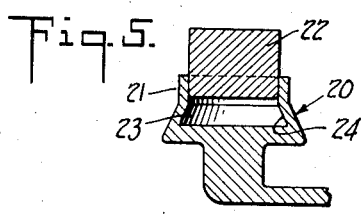
Figure 5 is a vertical fragmentary section of a member provided with another form of soldering joint according to our invention, the soldering element being shown just prior to being pressed into final position.
Figure 6:
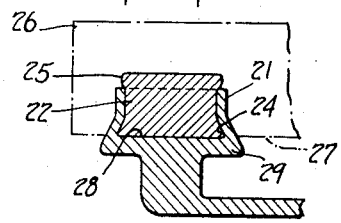
Figure 6 illustrates the parts of Figure 5 after the disk has been operatively pressed into position, the dot-dash lines indicating the position of the complementary member.

Instead of employing the prongs 16 of the form shown in Figures 3 and 4, a retaining socket 20 (Figure 5) may be used containing a preferably laterally enclosed wall 21 shaped to receive the preformed soldering disk 22. The internal cavity of cup 20 has an enlarged portion 23 at the bottom thereof providing an annular recess 24. When the soldering disk is pressed into cup 20, the pressure will cause the lower portion thereof to be forced into said recess 24, as shown in Figure 6. This will readily occur due to the fact that the soldering material is, as aforesaid, relatively soft, and can be caused to fill in said recess under a suitable pressure provided by conventional means well known in the art. Such pressure may cause a slight bulging out of the upper portion 25 of the soldering disk 22; and to accommodate such enlarged protruding portion, the member 26 (shown in dot-dash lines) can be provided with a suitable cavity to receive both the cap 20 and the said protruding portion of the soldering disk. It will be observed that the lower surface 27 of member 26 extends, in the form of our invention illustrated in Figure 6, substantially to the level 28 of base 29, so as to conceal a considerable portion of the joint.

Figure 7:
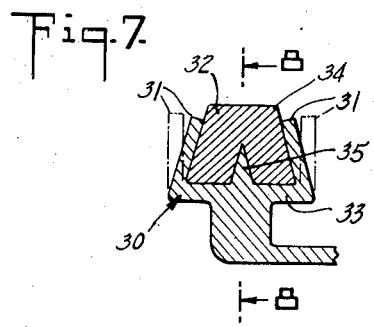
Figure 7 is a fragmentary vertical section of a member provided with another form of soldering base according to our invention, the dot-dash lines representing the position of the retaining walls before being operatively pressed against the soldering element.
Figure 8:
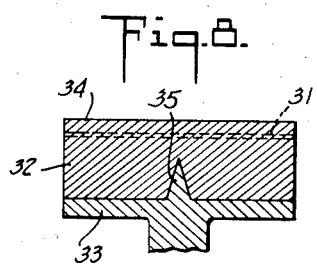
Figure 8 is a vertical section of Figure 7 taken substantially along line 8—8 thereof.

In Figures 7 and 8 is shown another modification of our invention wherein the solder retaining member 30 is of channel-like structure, containing the two walls 31. The preformed soldering element 32 is operatively placed upon base 33 with the upper portion 34 protruding a predetermined amount; and thereafter, by suitable conventional means well known in the art, the said walls 31 are pressed inwardly up against the adjacent walls of said soldering element 32. It is preferred that the said soldering element have upwardly and inwardly inclined lateral walls, so that the walls 31 will readily hold element 32 against upward displacement by virtue of the fact that the lower portion of the soldering piece is of greater width than the upper portion. It is also preferred to employ a prong element 35 extending upwardly from base 33, so that upon an operative insertion of soldering element 32, the said prong 35 will enter the body thereof and hold it against displacement.

The various forms of retainers or sockets above described can readily be attached to or made integral with various types of members intended to be soldered to other members. Such retainers are preferably made no larger than necessary to accommodate the required amount of soldering material as contained in the preformed soldering element, and hence will not constitute any structural impediment or undesirable obstruction on the members. Units can be sold either with or without the preformed soldering element in place, and in either event will obviously constitute devices of great convenience to persons in the jewelry trade, and in other industries where soldering means must be employed.

It is of course understood that other additional forms and modifications of the device and adaptation of the method constituting this invention can be employed beyond and in addition to those hereinbefore described, all within the scope of the appended claims.

What we claim is:

1. In a device for soldering together two members of a structural combination, a soldering element of predetermined configuration, a retaining socket on one of said members embracing and in pressing engagement only with the lower portion of the outer surface of said element, the upper portion of the element protruding unobstructedly above said socket, and a juncture portion on the other of said members adapted for engagement with said protruding portion of said soldering element, whereby a joinder of the two members may be effected by a suitable soldering operation.

2. In a device for soldering together two members of a structural combination, a soldering element of predetermined configuration, pronged retaining means on one of said members in frictional engagement with the lower portion of said element, another portion of the element protruding unobstructedly from said retaining means, and a juncture portion on the other of said members adapted for engagement with said protruding portion of said soldering element, whereby a joinder of the two members may be effected by a suitable soldering operation.

3. In a device for soldering together two members of a structural combination, a soldering element of predetermined configuration, retaining means on one of said members containing oppositely disposed wall members in pressing engagement with the lower portion of said element, said wall members being closer spaced at their upper portions than at their lower portions for preventing an upward dislodgement of said element, the upper portion of the element protruding unobstructedly above said wall members, and a juncture portion on the other of said members adapted for engagement with said protruding portion of said soldering element, whereby a joinder of the two members may be effected by a suitable soldering operation.

4. In a device for soldering together two members of a structural combination, a disc-like soldering element, a retaining socket on one of said members in embracing engagement with a portion of the lateral surface of the element, another portion of the element protruding unobstructedly from the socket, and a juncture portion on the other of said members adapted for engagement with said protruding portion of said soldering element, whereby a joinder of the two members may be effected by a suitable soldering operation, said juncture portion comprising a recessed portion adapted to envelop the said protruding portion of the element.

5. In a device for soldering together two members of a structural combination, a disc-like soldering element, a retaining socket disposed upon the upper surface of one of said members, said socket being in embracing engagement with the lateral surface of the element, a portion of the element protruding unobstructedly from the socket, and a juncture portion on the other of said members adapted for engagement with said protruding portion of said soldering element, whereby a joinder of the two members may be effected by a suitable soldering operation, said juncture portion comprising a recessed portion adapted to contain therein and envelop said socket substantially up to the level of said upper surface of the member upon which it is disposed.

6. In a device for soldering together two members of a structural combination, a disc-like soldering element, a retaining socket on one of said members embracing said element, said socket comprising a plurality of prongs with inwardly extending teeth in engagement with said element, said teeth being disposed below the upper surface of the element thereby leaving a portion of the element protruding unobstructedly thereabove, and a juncture portion on the other of said members adapted for engagement with said protruding portion of said soldering element, whereby a joinder of the two members may be effected by a suitable soldering operation.

7. In a device for soldering together two members of a structural combination, a soldering element of predetermined configuration, a channel-like retaining member on one of said members in pressing engagement with opposite lateral surfaces of said element, a portion of the element protruding unobstructedly beyond said retaining member, and a juncture portion on the other of said members adapted for engagement with said protruding portion of said soldering element, whereby a joinder of the two members may be effected by a suitable soldering operation.

8. In a device for soldering together two members of a structural combination, a soldering element of predetermined configuration, retaining means on one of said members including a prong member extending upwardly into the body of said element for holding it against displacement, and a juncture portion on the other of said members adapted for engagement with a portion of said element remote from said prong member, whereby a joinder of the two members may be effected by a suitable soldering operation.

SAMUEL DARVIE.
SAMUEL PEARLMAN.